United States Patent
Alam

(10) Patent No.: US 10,069,538 B2
(45) Date of Patent: Sep. 4, 2018

(54) FAULT TOLERANT PHYSICAL LAYER SOLUTION FOR FOUNDATION FIELDBUS H1 NETWORKS OR OTHER NETWORKS IN INDUSTRIAL PROCESS CONTROL AND AUTOMATION SYSTEMS

(71) Applicant: Honeywell International Inc., Morris Plains, NJ (US)

(72) Inventor: Mohd J. Alam, Houston, TX (US)

(73) Assignee: Honeywell International Inc., Morris Plains, NJ (US)

( * ) Notice: Subject to any disclaimer, the term of this patent is extended or adjusted under 35 U.S.C. 154(b) by 126 days.

(21) Appl. No.: 15/092,935

(22) Filed: Apr. 7, 2016

(65) Prior Publication Data

US 2017/0111212 A1    Apr. 20, 2017

Related U.S. Application Data

(60) Provisional application No. 62/242,834, filed on Oct. 16, 2015.

(51) Int. Cl.
*H04L 12/24* (2006.01)
*H04B 3/58* (2006.01)

(52) U.S. Cl.
CPC .......... *H04B 3/58* (2013.01); *H04L 41/0659* (2013.01); *H04L 41/0677* (2013.01)

(58) Field of Classification Search
CPC .............................. H04L 41/0677; H04B 3/58
See application file for complete search history.

(56) References Cited

U.S. PATENT DOCUMENTS 6,690,916 B1 *  2/2004  Yenerim ............ H04B 7/15535
                                                  370/315

OTHER PUBLICATIONS

ARC White Paper, "The Business Value Proposition of Control in the Field," Nov. 2009, pp. 1-20, publisher ARC Advisory Group, Dedham, MA.
Moore Hawke Fieldbus Worldwide, "Installing Fieldbus," 2010, pp. 1-9, available at www.miinet.com/moorehawke.
FIELDBUS FOUNDATION™, "31,25 KBIT/s Intrinsically Safe Systems," Application Guide, 1996-2004, pp. 1-77, publisher USA Fieldbus Foundation, Austin, TX.
FIELDBUS FOUNDATION™, "IEC61158 Technology Comparison," Aug. 2008, pp. 65, publisher Fieldbus Inc., Austin, TX.

(Continued)

*Primary Examiner* — Ronald B Abelson
(74) *Attorney, Agent, or Firm* — Anthony Miologos

(57) ABSTRACT

An apparatus includes at least one processing device configured to detect a cable fault that divides a network segment into first and second portions and that communicatively disconnects the second portion from the first portion. The apparatus also includes repeater configured to communicatively connect the second portion of the network segment to the first portion of the network segment such that one or more devices associated with the first portion maintain communication with one or more devices associated with the second portion. The at least one processing device could identify whether one or more of multiple linking devices coupled to the network segment are operating as active link masters using at least some of the decoded messages and detect the cable fault when more than one of the linking devices is operating as an active link master.

18 Claims, 5 Drawing Sheets

(56) References Cited

OTHER PUBLICATIONS

Anderson, Stephen D., "Cable Characteristics for Fieldbus," 1992, pp. 607-611, publisher IEEE, Piscataway, NJ.
FIELDBUS FOUNDATION™, "Systems Engineering Guidelines," Sep. 2012, pp. 1-137, publisher Fieldbus Foundation, Austin, TX.
FIELDBUS FOUNDATION™, "Library A Function Blocks Instruction Manual," Function Block Instruction Manual, Jul. 2010, pp. 320, publisher Fieldbus Foundation, Austin, TX.
FIELDBUS FOUNDATION™, "Technical Overview," Technical Overview FD-043 Revision 3.0, 1996 and revised 1998 and 2003, pp. 37, publisher Fieldbus Foundation, Austin, TX.
ARC White Paper, "Foundation Fieldbus Provides Automation Infrastructure for Operational Excellence," Feb. 2007, pp. 1-23, publisher ARC Advisory Group, Dedham, MA.
Gustav Alholt, et al., "Examining Fieldbus Quality—A comparative study of fieldbus attributes," Bachelor of Science Thesis in the Software Engineering and Management, Jun. 2013, pp. 1-17, publisher University of Gothenburg, Chalmers University of Technology, Department of Computer Science and Engineering, Göteborg, Sweden.
FIELDBUS FOUNDATION™, Wiring and Installation 31.25 kbits/s, Voltage Mode, Wire Medium, Application Guide AG-140 Revision 1.0, 1996, pp. 33, publisher Fieldbus Foundation, Austin, TX.
Tom Boyd, et al., "Redundancy Concepts in FOUNDATION™ Fieldbus H1," 1999, pp. 1-10, publisher Instrument Society of America.
FIELDBUS FOUNDATION™, "Fieldbus Network Analyzer," User's Manual, Jan. 2005, pp. 56, publisher Smar, available at www.smar.com/contactsus.asp.
Yoon, et al., "Ring Topology-based Redundancy Ethernet," for Industrial Network, SICE-ICASE International Joint Confeerence 2006, Oct. 18-21, 2006, 2006, pp. 1404-1407, publisher ICASE, Hatfield, UK.
Felser, Max, "Media Redundancy for Profinet IO," 2008, pp. 6, publisher publisher IEEE, Piscataway, NJ.
Abouei Ardakan M, et al., "Optimizing bi-objective redundancy allocation problem with a mixed redundancy strategy," ISA Transactions, Oct. 2014, pp. 13, available at http://dx.doi.org/10.1016/j.isatra.2014.10.002i.
Foundation Fieldbus Linking Devices, "Combine the Power of PlantPAx with Foundation Fieldbus Technology," 2012, pp. 2, publisher Rockwell Automation, Inc., Milwaukee, WI.
O'Neil, Mike, "A Truly Redundant Wiring Solution for Foundation Fieldbus Segments," Apr. 2014, pp. 1-10, publisher Foundation Fieldbus End Users Council Australia Inc., St. Duncraig, WA.
Rufino, Jose, "Dual-Media Redundancy Mechanics for CAN," Technical Report: CSTC RT-97-01, Jan. 1997, pp. 10, publisher CSTC—Centro de Sistemas Telem'aticos e Computacionais Instituto Superior T'ecnico, Lisboa Codex, Portugal.
Yu, H. Bu, et al., "Hydrocarbon Processing," Oct. 2006, pp. 5, publisher Gulf Publishing Company, Houston, TX.

* cited by examiner

FAULT TOLERANT PHYSICAL LAYER SOLUTION FOR FOUNDATION FIELDBUS H1 NETWORKS OR OTHER NETWORKS IN INDUSTRIAL PROCESS CONTROL AND AUTOMATION SYSTEMS

CROSS-REFERENCE TO RELATED APPLICATION AND PRIORITY CLAIM

This application claims priority under 35 U.S.C. § 119(e) to U.S. Provisional Patent Application No. 62/242,834 filed on Oct. 16, 2015, which is hereby incorporated by reference in its entirety.

TECHNICAL FIELD

This disclosure relates generally to industrial process control and automation systems. More specifically, this disclosure relates to a fault tolerant physical layer solution for FOUNDATION FIELDBUS H1 networks or other networks in industrial process control and automation systems.

BACKGROUND

Industrial process control and automation systems are often used to automate large and complex industrial processes. These types of systems routinely include sensors, actuators, and controllers. Some of the controllers typically operate to control an industrial process by receiving measurements from the sensors and generating control signals for the actuators. Various types of technologies are available for linking sensors, actuators, and controllers. One such type of technology is the FOUNDATION FIELDBUS H1 network, which is used to interconnect sensors, actuators, and input/output (I/O) of the controllers in an industrial facility.

SUMMARY

This disclosure provides a fault tolerant physical layer solution for FOUNDATION FIELDBUS H1 networks or other networks in industrial process control and automation systems.

In a first embodiment, an apparatus includes at least one processing device configured to detect a cable fault that divides a network segment into first and second portions and that communicatively disconnects the second portion of the network segment from the first portion of the network segment. The apparatus also includes a repeater configured to communicatively connect the second portion of the network segment to the first portion of the network segment such that one or more devices associated with the first portion of the network segment maintain communication with one or more devices associated with the second portion of the network segment.

In a second embodiment, a system includes a network segment having (i) cabling that couples multiple junction boxes configured to be coupled to multiple devices and (ii) power supplies configured to provide power to the multiple devices. The system also includes a dynamic synchronization repeater having at least one processing device and a repeater. The at least one processing device is configured to detect a cable fault that divides the network segment into first and second portions and that communicatively disconnects the second portion of the network segment from the first portion of the network segment. The repeater is configured to communicatively connect the second portion of the network segment to the first portion of the network segment such that one or more of the multiple devices that are associated with the first portion of the network segment maintain communication with one or more other of the multiple devices that are associated with the second portion of the network segment.

In a third embodiment, a method includes detecting, using at least one processing device, a cable fault that divides a network segment into first and second portions and that communicatively disconnects the second portion of the network segment from the first portion of the network segment. The method also includes communicatively connecting the second portion of the network segment to the first portion of the network segment using a repeater such that one or more devices associated with the first portion of the network segment maintain communication with one or more devices associated with the second portion of the network segment.

Other technical features may be readily apparent to one skilled in the art from the following figures, descriptions, and claims.

BRIEF DESCRIPTION OF THE DRAWINGS

For a more complete understanding of this disclosure and its features, reference is now made to the following description, taken in conjunction with the accompanying drawings, in which.

DETAILED DESCRIPTION

FIGS. 1 through 6, discussed below, and the various embodiments used to describe the principles of the present invention in this patent document are by way of illustration only and should not be construed in any way to limit the scope of the invention. Those skilled in the art will understand that the principles of the invention may be implemented in any type of suitably arranged device or system.

Figure 1:
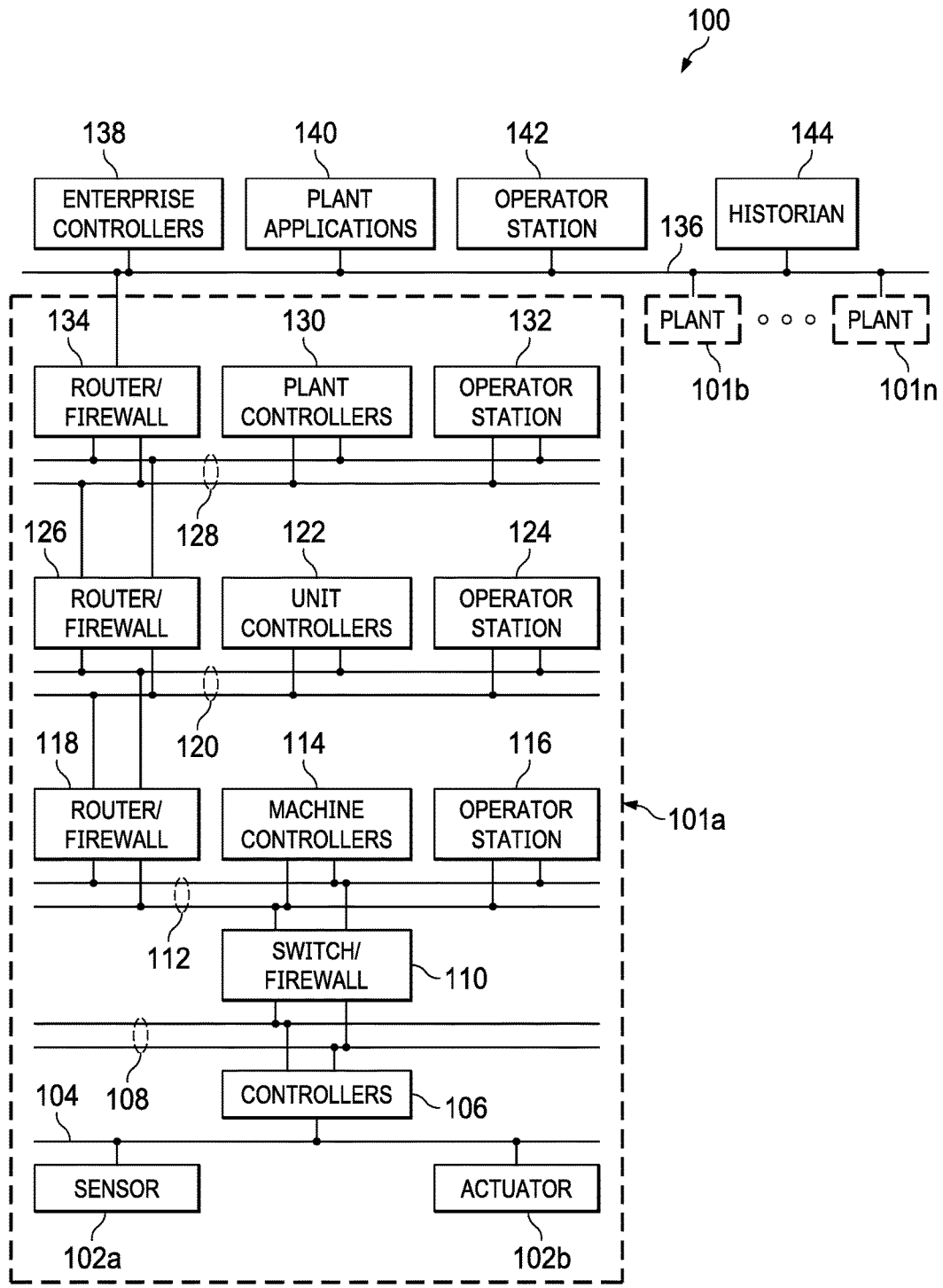
FIG. 1 illustrates an example industrial process control and automation system according to this disclosure.

FIG. 1 illustrates an example industrial process control and automation system 100 according to this disclosure. As shown in FIG. 1, the system 100 includes various components that facilitate production or processing of at least one product or other material. For instance, the system 100 is used here to facilitate control over components in one or multiple plants 101a-101n. Each plant 101a-101n represents one or more processing facilities (or one or more portions thereof), such as one or more manufacturing facilities for producing at least one product or other material. In general, each plant 101a-101n may implement one or more processes and can individually or collectively be referred to as a process system. A process system generally represents any system or portion thereof configured to process one or more products or other materials in some manner.

In FIG. 1, the system 100 is implemented using the Purdue model of process control. In the Purdue model, "Level 0" may include one or more sensors 102a and one or more actuators 102b. The sensors 102a and actuators 102b represent components in a process system that may perform any of a wide variety of functions. For example, the sensors 102a could measure a wide variety of characteristics in the process system, such as temperature, pressure, or flow rate. Also, the actuators 102b could alter a wide variety of characteristics in the process system. The sensors 102a and actuators 102b could represent any other or additional components in any suitable process system. Each of the sensors 102a includes any suitable structure for measuring one or more characteristics in a process system. Each of the actuators 102b includes any suitable structure for operating on or affecting one or more conditions in a process system.

At least one network 104 is coupled to the sensors 102a and actuators 102b. The network 104 facilitates interaction with the sensors 102a and actuators 102b. For example, the network 104 could transport measurement data from the sensors 102a and provide control signals to the actuators 102b. The network 104 could represent any suitable network or combination of networks. As a particular example, the network 104 could represent a FOUNDATION FIELDBUS H1 network or a PROFIBUS PA network.

In the Purdue model, "Level 1" may include one or more controllers 106, which are coupled to the network 104. Among other things, each controller 106 may use the measurements from one or more sensors 102a to control the operation of one or more actuators 102b. For example, a controller 106 could receive measurement data from one or more sensors 102a and use the measurement data to generate control signals for one or more actuators 102b. Each controller 106 includes any suitable structure for interacting with one or more sensors 102a and controlling one or more actuators 102b. Each controller 106 could, for example, represent a proportional-integral-derivative (PID) controller or a multivariable controller, such as a Robust Multivariable Predictive Control Technology (RMPCT) controller or other type of controller implementing model predictive control (MPC) or other advanced predictive control (APC). As a particular example, each controller 106 could represent a computing device running a real-time operating system.

Two networks 108 are coupled to the controllers 106. The networks 108 facilitate interaction with the controllers 106, such as by transporting data to and from the controllers 106. The networks 108 could represent any suitable networks or combination of networks. As a particular example, the networks 108 could represent a redundant pair of Ethernet networks, such as a FAULT TOLERANT ETHERNET (FTE) network from HONEYWELL INTERNATIONAL INC.

At least one switch/firewall 110 couples the networks 108 to two networks 112. The switch/firewall 110 may transport traffic from one network to another. The switch/firewall 110 may also block traffic on one network from reaching another network. The switch/firewall 110 includes any suitable structure for providing communication between networks, such as a HONEYWELL CONTROL FIREWALL (CF9) device. The networks 112 could represent any suitable networks, such as an FTE network.

In the Purdue model, "Level 2" may include one or more machine-level controllers 114 coupled to the networks 112. The machine-level controllers 114 perform various functions to support the operation and control of the controllers 106, sensors 102a, and actuators 102b, which could be associated with a particular piece of industrial equipment (such as a boiler or other machine). For example, the machine-level controllers 114 could log information collected or generated by the controllers 106, such as measurement data from the sensors 102a or control signals for the actuators 102b. The machine-level controllers 114 could also execute applications that control the operation of the controllers 106, thereby controlling the operation of the actuators 102b. In addition, the machine-level controllers 114 could provide secure access to the controllers 106. Each of the machine-level controllers 114 includes any suitable structure for providing access to, control of, or operations related to a machine or other individual piece of equipment. Each of the machine-level controllers 114 could, for example, represent a server computing device running a MICROSOFT WINDOWS operating system. Although not shown, different machine-level controllers 114 could be used to control different pieces of equipment in a process system (where each piece of equipment is associated with one or more controllers 106, sensors 102a, and actuators 102b).

One or more operator stations 116 are coupled to the networks 112. The operator stations 116 represent computing or communication devices providing user access to the machine-level controllers 114, which could then provide user access to the controllers 106 (and possibly the sensors 102a and actuators 102b). As particular examples, the operator stations 116 could allow users to review the operational history of the sensors 102a and actuators 102b using information collected by the controllers 106 and/or the machine-level controllers 114. The operator stations 116 could also allow the users to adjust the operation of the sensors 102a, actuators 102b, controllers 106, or machine-level controllers 114. In addition, the operator stations 116 could receive and display warnings, alerts, or other messages or displays generated by the controllers 106 or the machine-level controllers 114. Each of the operator stations 116 includes any suitable structure for supporting user access and control of one or more components in the system 100. Each of the operator stations 116 could, for example, represent a computing device running a MICROSOFT WINDOWS operating system.

At least one router/firewall 118 couples the networks 112 to two networks 120. The router/firewall 118 includes any suitable structure for providing communication between networks, such as a secure router or combination router/firewall. The networks 120 could represent any suitable networks, such as an FTE network.

In the Purdue model, "Level 3" may include one or more unit-level controllers 122 coupled to the networks 120. Each unit-level controller 122 is typically associated with a unit in a process system, which represents a collection of different machines operating together to implement at least part of a process. The unit-level controllers 122 perform various functions to support the operation and control of components in the lower levels. For example, the unit-level controllers 122 could log information collected or generated by the components in the lower levels, execute applications that control the components in the lower levels, and provide secure access to the components in the lower levels. Each of the unit-level controllers 122 includes any suitable structure for providing access to, control of, or operations related to one or more machines or other pieces of equipment in a process unit. Each of the unit-level controllers 122 could, for example, represent a server computing device running a MICROSOFT WINDOWS operating system. Although not shown, different unit-level controllers 122 could be used to control different units in a process system (where each unit is associated with one or more machine-level controllers 114, controllers 106, sensors 102a, and actuators 102b).

Access to the unit-level controllers 122 may be provided by one or more operator stations 124. Each of the operator stations 124 includes any suitable structure for supporting user access and control of one or more components in the system 100. Each of the operator stations 124 could, for example, represent a computing device running a MICROSOFT WINDOWS operating system.

At least one router/firewall 126 couples the networks 120 to two networks 128. The router/firewall 126 includes any suitable structure for providing communication between networks, such as a secure router or combination router/firewall. The networks 128 could represent any suitable networks, such as an FTE network.

In the Purdue model, "Level 4" may include one or more plant-level controllers 130 coupled to the networks 128. Each plant-level controller 130 is typically associated with one of the plants 101a-101n, which may include one or more process units that implement the same, similar, or different processes. The plant-level controllers 130 perform various functions to support the operation and control of components in the lower levels. As particular examples, the plant-level controller 130 could execute one or more manufacturing execution system (MES) applications, scheduling applications, or other or additional plant or process control applications. Each of the plant-level controllers 130 includes any suitable structure for providing access to, control of, or operations related to one or more process units in a process plant. Each of the plant-level controllers 130 could, for example, represent a server computing device running a MICROSOFT WINDOWS operating system.

Access to the plant-level controllers 130 may be provided by one or more operator stations 132. Each of the operator stations 132 includes any suitable structure for supporting user access and control of one or more components in the system 100. Each of the operator stations 132 could, for example, represent a computing device running a MICROSOFT WINDOWS operating system.

At least one router/firewall 134 couples the networks 128 to one or more networks 136. The router/firewall 134 includes any suitable structure for providing communication between networks, such as a secure router or combination router/firewall. The network 136 could represent any suitable network, such as an enterprise-wide Ethernet or other network or all or a portion of a larger network (such as the Internet).

In the Purdue model, "Level 5" may include one or more enterprise-level controllers 138 coupled to the network 136. Each enterprise-level controller 138 is typically able to perform planning operations for multiple plants 101a-101n and to control various aspects of the plants 101a-101n. The enterprise-level controllers 138 can also perform various functions to support the operation and control of components in the plants 101a-101n. As particular examples, the enterprise-level controller 138 could execute one or more order processing applications, enterprise resource planning (ERP) applications, advanced planning and scheduling (APS) applications, or any other or additional enterprise control applications. Each of the enterprise-level controllers 138 includes any suitable structure for providing access to, control of, or operations related to the control of one or more plants. Each of the enterprise-level controllers 138 could, for example, represent a server computing device running a MICROSOFT WINDOWS operating system. In this document, the term "enterprise" refers to an organization having one or more plants or other processing facilities to be managed. Note that if a single plant 101a is to be managed, the functionality of the enterprise-level controller 138 could be incorporated into the plant-level controller 130.

Various plant applications 140 could also be executed in the system 100. In this example, the plant applications 140 are shown as residing on Level 5 of the system 100, although plant applications 140 could reside on other or additional levels of the system 100. The plant applications 140 could represent any suitable applications that are executed by server computers or other computing devices.

Access to the enterprise-level controllers 138 and plant applications 140 may be provided by one or more enterprise desktops (also referred to as operator stations) 142. Each of the enterprise desktops 142 includes any suitable structure for supporting user access and control of one or more components in the system 100. Each of the enterprise desktops 142 could, for example, represent a computing device running a MICROSOFT WINDOWS operating system.

Various levels of the Purdue model can include other components, such as one or more databases. The database(s) associated with each level could store any suitable information associated with that level or one or more other levels of the system 100. For example, a historian 144 can be coupled to the network 136. The historian 144 could represent a component that stores various information about the system 100. The historian 144 could, for instance, store information used during production scheduling and optimization. The historian 144 represents any suitable structure for storing and facilitating retrieval of information. Although shown as a single centralized component coupled to the network 136, the historian 144 could be located elsewhere in the system 100, or multiple historians could be distributed in different locations in the system 100.

In particular embodiments, the various controllers and operator stations in FIG. 1 may represent computing devices. For example, each of the controllers 106, 114, 122, 130, 138 and each of the operator stations 116, 124, 132, 142 could include one or more processing devices and one or more memories for storing instructions and data used, generated, or collected by the processing device(s). Each of the controllers 106, 114, 122, 130, 138 and each of the operator stations 116, 124, 132, 142 could also include at least one network interface, such as one or more Ethernet interfaces or wireless transceivers, facilitating communication over one or more networks or communication paths.

FOUNDATION FIELDBUS H1 is widely used for industrial process control and automation, such as to interconnect sensors, actuators, and input/output (I/O) of controllers in an industrial facility. However, the FOUNDATION FIELDBUS H1 specification offers no physical layer (media) redundancy. As a result, a break or other fault in a FOUNDATION FIELDBUS H1 connection can prevent all communications over the H1 connection. This raises serious reliability concerns, such as for critical process control applications where a loss of view or a loss of control over an industrial process (or a portion thereof) could be catastrophic. One conventional approach to solving this problem involves "doubling up" various components of the H1 network and a supervisory network, such as power conditioners in the H1 network and linking devices in the supervisory network. However, this obviously increases the cost and complexity of the overall system.

As a result, FOUNDATION FIELDBUS systems are often deployed as digital I/O networks for proprietary controllers without taking advantage of their control distribution capabilities. Also, system designers often (i) limit the number of field devices (such as sensors and actuators) allowed on a segment of an H1 network and (ii) assign field devices with similar criticality (from a process point of view) on the same H1 segment. Even then, the reliability of each H1 segment typically depends on a single communication link, and a fault in that communication link (such as a break) causes partial or complete loss of view and control.

Control in the Field (also referred to as CiF) is a key enabler of FOUNDATION FIELDBUS technology to achieve a more available system by achieving single loop integrity through distribution of control from a centralized controller to "smart" field devices. CiF can provide superior reaction to disturbances in an industrial process, so it is well-suited for controlling faster processes. However, the benefits offered by CiF are easily compromised by a fault in an H1 segment's communication medium.

The lack of H1 physical layer fault tolerance in a typical FOUNDATION FIELDBUS system can therefore create a number of challenges. For example, a fault in an H1 trunk could cause all devices on an H1 segment to lose power and go offline (out of service). The extent of the damage would depend on the topology of the network, the location and number of power supplies, and the location of linking device (LD) connection(s) to the H1 segment. Also, since one communication link could carry data for multiple field devices, the failure of a single communication link could affect more than one process control loop. In addition, a partial or complete loss of view may occur, and control loops running CiF may shed to a failure mode depending on the location of the communication link fault.

Loss of view and loss of control are two important concerns with FOUNDATION FIELDBUS system design and deployment. These concerns are very real, and their impact to a process depends on how a particular system's fault tolerance is designed, regardless of whether control is implemented in a central controller or in the field. If controls are distributed into FOUNDATION FIELDBUS field devices on an H1 segment designed with current engineering best practices but with no media redundancy, when a trunk cable breaks or otherwise fails, the best result that can normally be obtained is a safe shutdown of the industrial process. This can be achieved by providing redundant power to the H1 segment from both ends of the segment and careful configuration of the field devices for fault-state actions. In such a system, there will be a total loss of control, and there may or may not be a loss of view depending on the capabilities of the particular linking devices used.

This disclosure provides devices and methods that can be used to achieve uninterrupted control and communication, even when there is a fault in a main trunk cable of a segment of an H1 network or other network. Uninterrupted communication includes maintaining both scheduled and unscheduled traffic so that any control being executed in a central controller continues without shedding and, at the same time, supervisory data acquisition service remains intact. This can reduce or eliminate concerns over the loss of control and loss of view from a segment failure and increase overall system reliability.

More specifically, this disclosure describes a dynamic synchronization repeater (DSR) designed for H1 networks passing FOUNDATION FIELDBUS messages or other networks. When a network segment experiences a fault that divides the network segment into multiple sub-segments, one of those sub-segments (referred to as a "broken" sub-segment) can be cut off from normal communications with a central controller. A dynamic synchronization repeater can be used to extend the broken sub-segment back into the original segment. This allows the broken sub-segment to be converted into an extension of the original segment before any fault is registered. Additional details regarding the dynamic synchronization repeater are provided below.

Although FIG. 1 illustrates one example of an industrial process control and automation system 100, various changes may be made to FIG. 1. For example, a control system could include any number of sensors, actuators, controllers, servers, operator stations, networks, DSRs, and other components. Also, the makeup and arrangement of the system 100 in FIG. 1 is for illustration only. Components could be added, omitted, combined, or placed in any other suitable configuration according to particular needs. Further, particular functions have been described as being performed by particular components of the system 100. This is for illustration only. In general, process control systems are highly configurable and can be configured in any suitable manner according to particular needs. In addition, while FIG. 1 illustrates one example environment in which a DSR can be used, this functionality can be used in any other suitable device or system.

Figure 2:
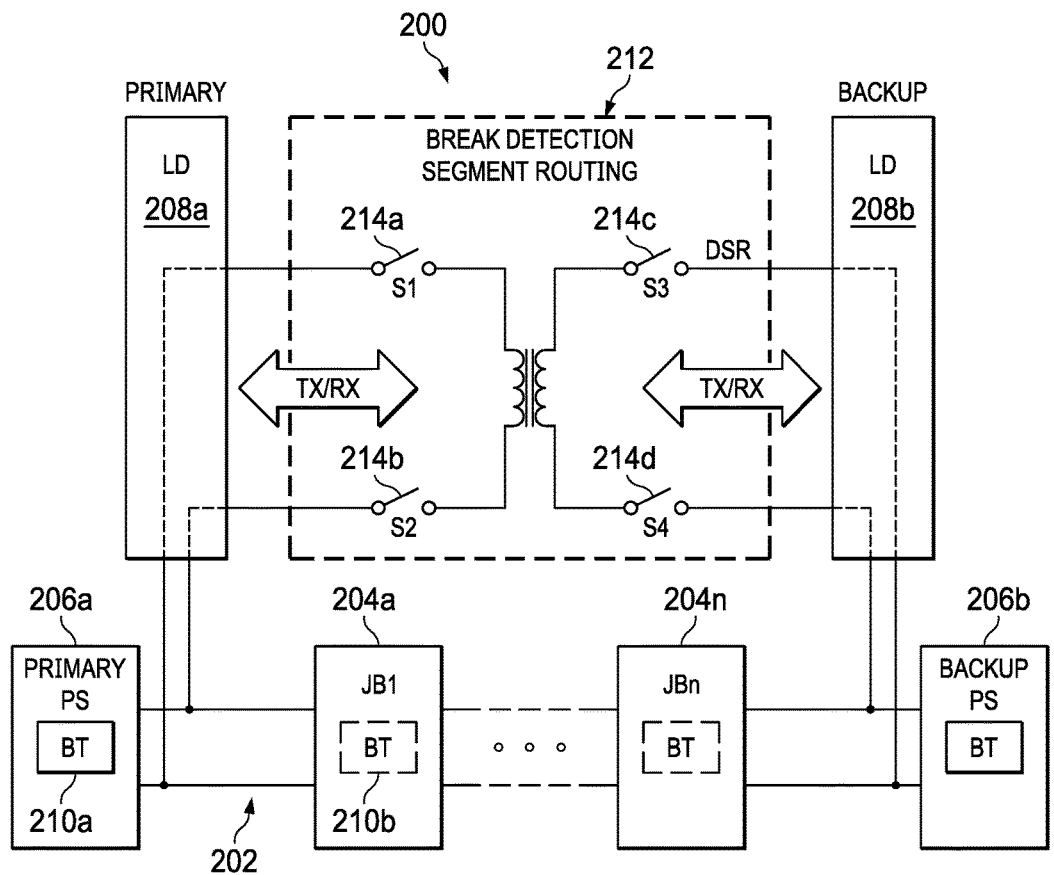
FIG. 2 illustrates an example network segment with fault tolerance according to this disclosure.

FIG. 2 illustrates an example network segment 200 with fault tolerance according to this disclosure. The network segment 200 here could denote a FOUNDATION FIELDBUS H1 network segment, although other types of network segments could also be used.

As shown in FIG. 2, the network segment 200 includes cabling 202 that couples various junction boxes 204a-204n and power supplies 206a-206b. The cabling 202 denotes any suitable communication medium or media configured to transport data in the network segment 200. The cabling 202 can also be used to transport power through the network segment 200 for various devices connected to the network segment 200. The cabling 202 could, for example, denote a twisted-pair connection.

Each of the junction boxes 204a-204n denotes a device coupler configured to couple the network segment 200 to one or more control and automation devices, such as one or more sensors, actuators, or controllers. Any number of junction boxes 204a-204n could be provided in a network segment depending on, for example, the number of sensors used, the number of actuators used, and/or their distribution in a plant area. In some instances, the total number of junction boxes 204a-204n could vary depending on whether power is being provided to the devices coupled to the junction boxes 204a-204n through the cabling 202. In particular embodiments, the network segment 200 could include up to 16 or up to 32 junction boxes, where each junction box connects to a single device. Each of the junction boxes 204a-204n includes any suitable structure configured to couple one or more devices to a network segment.

The power supplies 206a-206b can be used to supply operating power over the cabling 202 to one or more devices. The power supplies 206a-206b could supply any suitable type and amount of power. Each of the power supplies 206a-206b includes any suitable structure for providing electrical power. In some embodiments, each of the power supplies 206a-206b includes a bulk direct current (DC) power supply and a power conditioner (PC).

Linking devices (LDs) 208a-208b are used to connect the network segment 200 to a higher-level supervisory network. For example, linking devices 208a-208b can be used to connect a FOUNDATION FIELDBUS H1 network segment to a FOUNDATION FIELDBUS HSE network. The linking devices 208a-208b can therefore help to connect the network segment 200 and integrate the network segment 200 into an upper level process control network (PCN). The linking devices 208a-208b could support the FOUNDA- TION FIELDBUS HSE or other protocol(s) to transfer measurements, control data, and other data between a process area and a supervisory system. Each linking device 208a-208b includes any suitable structure for facilitating communication between a network segment and a supervisory network.

In this example, one of the power supplies 206a is denoted as a primary power supply, while another of the power supplies 206b is denoted as a secondary or backup power supply. Similarly, one of the linking devices 208a is denoted as a primary linking device, while another of the linking devices 208b is denoted as a secondary or backup linking device. During normal operation, the primary power supply 206a supplies power to the devices coupled to the junctions boxes 204a-204n, and the linking device 208a transfers data between the network segment 200 and the supervisory network. However, when a fault occurs along the network segment 200 (such as when the cabling 202 breaks at some point), the secondary power supply 206b starts supplying power to one or more of the devices coupled to one or more of the junctions boxes 204a-204n, and the linking device 208b starts transferring data between at least part of the network segment 200 and the supervisory network.

Various devices in FIG. 2 are shown as including bus terminators (BTs) 210a-210b. Bus terminators may be a required component of an H1 network or other network segment. In H1 networks, for example, it may be required to have exactly two bus terminators for each H1 network segment. Each bus terminator 210a-210b includes any suitable structure for terminating a network connection, such as an impedance matching network. The impedance matching network could include a 100Ω resistor and a capacitor connected in series and configured to pass a 31.25 kbit/s H1 signals. Bus terminators are sometimes built into power conditioners or junction boxes. In this example, the bus terminators 210a denote terminators in power conditioners, while the bus terminators 210b denote terminators in junction boxes. Some or all of these bus terminators could denote dynamic bus terminators that can be selectively activated in response to a fault in the cabling 202 so that two bus terminators are actively used on one side of the cable fault and two bus terminators are actively used on another side of the cable fault.

A dynamic synchronization repeater (DSR) 212 is coupled to the network segment 200 and is used to provide fault tolerance in the network segment 200. In an H1 network or other network construction, a cable fault could divide an H1 or other network segment into multiple sub-segments. The dynamic synchronization repeater 212 detects a fault in the network segment 200 and operates to connect one sub-segment back into the original network segment.

After a cable fault, simply allowing each sub-segment of the network segment 200 to communicate via its respective linking device 208a-208b would allow supervisory controllers or other supervisory devices to communicate with the various devices coupled to the junction boxes 204a-204n. However, it is possible that one or more sensors, one or more actuators, and one or more controllers forming a control loop could be separated into the different sub-segments. For example, a sensor that provides measurement data and a controller that uses the measurement data could be separated into different sub-segments after a cable fault, or a controller that provides a control signal and an actuator that uses the control signal could be separated into different sub-segments after a cable fault. As a result, more may be needed to maintain control over an industrial process when a cable fault divides a network segment into multiple sub-segments.

In some embodiments including the one shown in FIG. 2, the dynamic synchronization repeater 212 can be coupled across the primary and backup linking devices 208a-208b or at other locations of a network segment and activated automatically when a cable fault is detected. The dynamic synchronization repeater 212 can (among other things) transform an isolated portion of the network segment 200 into an extension of the original network in response to the cable fault. For example, if an isolated or broken sub-segment denotes a portion of the network segment 200 to the right of a cable fault, the broken sub-segment can be made an extension of a portion of the network segment 200 to the left of the cable fault. The broken sub-segment can communicate via the linking device 208a, and all of the devices on the network segment 200 can communicate with one another. The dynamic synchronization repeater 212 can also restore the broken portion of the network segment to its prior state when the cable fault is resolved.

Fault detection is used by the dynamic synchronization repeater 212 to identify a cable fault and trigger the conversion of a broken portion of a network segment into an extension of another portion of the network. The roles and locations of the primary and backup linking devices 208a-208b lend themselves as possible places to detect cable faults, such as for U-shaped H1 segments or other network segments where linking devices are used at both ends of a U-shaped segment (note that the term "U-shaped" refers to a logical shape and not necessarily a physical layout of a network segment). As the primary and backup link masters of the segment, both linking devices 208a-208b can keep track of all devices on the segment, such as by maintaining a so-called "live list." Assuming a U-shaped segment is used for power and the linking devices 208a-208b are connected to the ends of the segment, adding communication links to the primary and backup linking devices 208a-208b would allow an algorithm to be run in order to detect cable faults. The communication links with the linking devices 208a-208b can be used to differentiate between a cable fault and a linking device failure. Upon the occurrence of a cable fault, both linking devices 208a-208b would assume the role of active link master for their respective portions of the segment. Even with one missing bus terminator on each side, the linking devices 208a-208b would be able to identify the devices live on their portions of the segment.

The linking devices 208a-208b are often installed near each other. In many instances, they reside in the same instrument cabinet. This close proximity makes it appropriate for the dynamic synchronization repeater 212 to be implemented in certain ways, such as (i) within one or more of the linking devices (where the linking devices are connected with a synchronizing channel) or (ii) in a separate module residing in the same instrument cabinet (where the separate module interconnects both linking devices through a synchronizing channel).

In some embodiments, to support fault detection, the dynamic synchronization repeater 212 monitors the active and backup link masters on a network to detect a cable fault on the H1 or other network segment. If a fault is detected, the dynamic synchronization repeater 212 restores the broken portion's communications by attaching the broken portion of the segment belonging to the backup link master back into the original segment as an extension of the original segment.

Thus, operation of the network segment 200 could occur as follows. Prior to a fault, the linking device 208a is in the primary role and handles all communications for the devices coupled to the junction boxes 204a-204n. The linking device 208b is in the backup role and could have access to a schedule of communications or other information so that it is ready to take over if the primary linking device 208a fails. Each linking device 208a-208b can maintain a live list of devices coupled to the network segment 200. The bus terminators 210b in the junction boxes 204a-204n may be inactive, and the bus terminators 210a in the power supplies 206a-206b may be the only two active bus terminators in the network segment 200.

When a cable fault occurs, both linking devices 208a-208b become primary linking devices, each for its own sub-segment. Each of the linking devices 208a-208b is missing devices from its live list. Two of the bus terminators 210b in two of the junction boxes 204a-204n may also be activated automatically so that each sub-segment includes only two active terminators. The dynamic synchronization repeater 212 detects the presence of the cable fault, such as by determining that both linking devices 208a-208b are operating in the primary role. In response, the dynamic synchronization repeater 212 activates its repeater circuitry to route signals between the two sub-segments. This effectively converts one sub-segment into an extension of the other sub-segment. Once this occurs, the linking devices 208a-208b once again detect each other, one of the linking devices 208a-208b drops from the primary role to the backup role, and the other linking device continues in the primary role with its live list.

Whether or not devices coupled to the junction boxes 204a-204n would register as missing from the live list of the now sole primary linking device and whether the link itself would be identified as a broken link depends on how fast the dynamic synchronization repeater 212 reacts to restore a broken sub-segment's connection. In many instances, the dynamic synchronization repeater 212 could react quickly enough so that no interruption occurs in a supervisory system or a control network.

In this example, the dynamic synchronization repeater 212 includes four switches 214a-214d, which can be used to selectively couple different sub-segments of the network segment 200 to repeater functionality. Each switch 214a-214d denotes any suitable structure for selectively forming a communication pathway, such as a toggle switch or a transistor switch. Note that the arrangement of the switches 214a-214d shown here is for illustration only and that various other arrangements (which may or may not include exactly four switches) could be used.

Although FIG. 2 illustrates one example of a network segment 200 with fault tolerance, various changes may be made to FIG. 2. For example, the dynamic synchronization repeater 212 could be used with network segments having other configurations.

Figure 3:
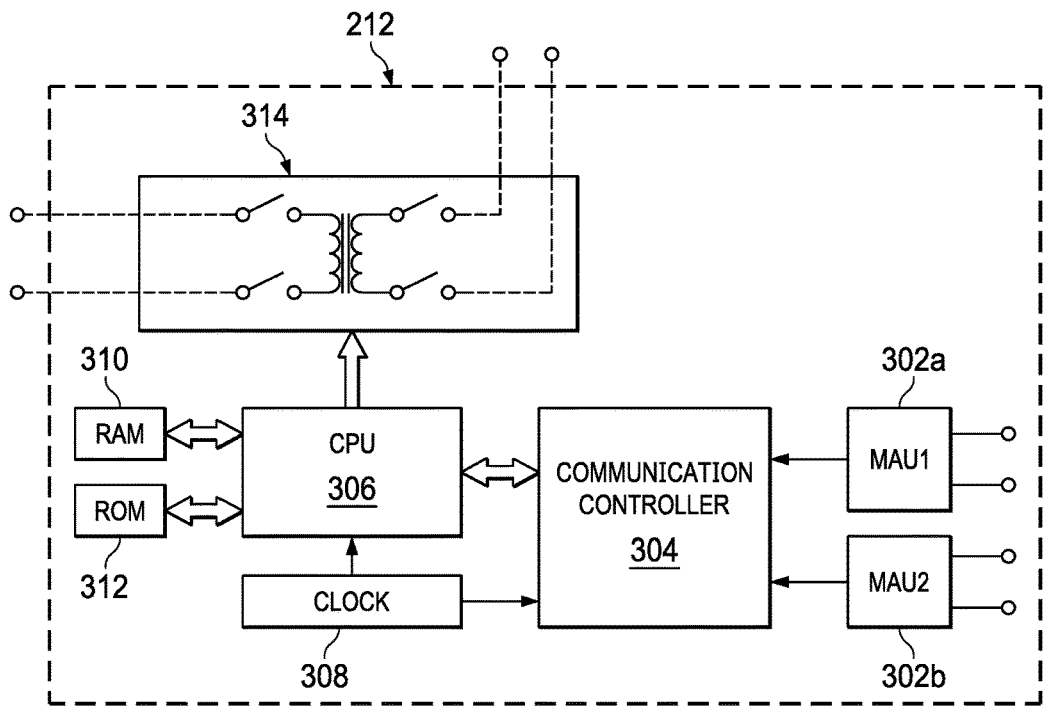
FIGS. 3 and 4 illustrate an example dynamic synchronization repeater for providing fault tolerance in FOUNDATION FIELDBUS H1 networks or other networks according to this disclosure.
Figure 4:
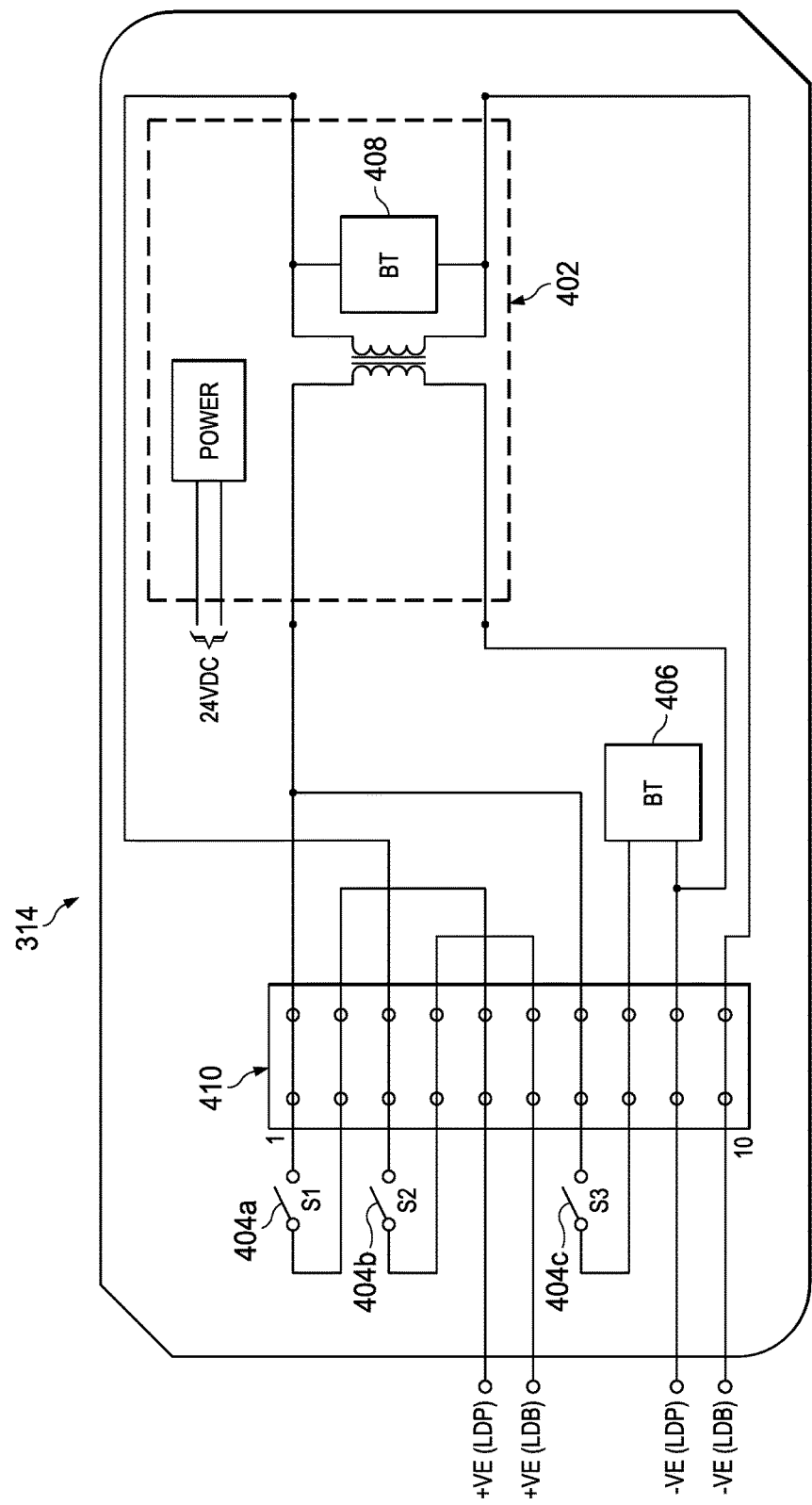

FIGS. 3 and 4 illustrate an example dynamic synchronization repeater 212 for providing fault tolerance in FOUNDATION FIELDBUS H1 networks or other networks according to this disclosure. In particular, FIG. 3 illustrates an example implementation of the dynamic synchronization repeater 212, while FIG. 4 illustrates an example implementation of repeater circuitry within the dynamic synchronization repeater 212.

As shown in FIG. 3, the dynamic synchronization repeater 212 can, among other things, perform a cable fault detection algorithm and connect different communication links when a cable fault is detected. The dynamic synchronization repeater 212 here includes two medium attachment units (MAUs) 302a-302b, which are configured to be coupled to different portions of a network segment. For example, the MAUs 302a-302b can be used to couple the dynamic synchronization repeater 212 to different locations of a FOUNDATION FIELDBUS (FF) network segment or other segment, such as or near ends of the network segment. In the example shown in FIG. 2, the MAUs 302a-302b can be coupled near ends of the network segment adjacent to the linking devices 208a-208b. Each MAU 302a-302b includes any suitable structure configured to be coupled to and support communications over a network segment.

A communication controller 304 is coupled to the MAUs 302a-302b and operates to receive FOUNDATION FIELDBUS or other messages from the MAUs 302a-302b. The received messages can be captured by the MAUs 302a-302b as the messages traverse the network segment 200. The communication controller 304 also decodes the messages in order to support functions such as cable fault detection. The communication controller 304 includes any suitable structure for receiving and decoding messages sent over a network segment.

At least one central processing unit (CPU) or other processing device 306 can perform various functions for controlling the operation of the dynamic synchronization repeater 212. For example, the processing device 306 can receive the decoded messages from the communication controller 304 and use the decoded messages to detect when a cable fault occurs. The processing device 306 can also activate repeater circuitry in response to the detected cable fault, such as to help connect a broken sub-segment back into a network segment. The processing device 306 includes any suitable processing or computing device(s), such as one or more microprocessors, microcontrollers, digital signal processors, field programmable gate arrays, application specific integrated circuits, or discrete logic devices.

Components in the dynamic synchronization repeater 212 support the operation of the processing device 306 and the communication controller 304. For example, a clock source 308 provides at least one clock signal to the processing device 306 and the communication controller 304 and denotes any suitable source of one or more clock signals. One or more memories, such as a random access memory (RAM) 310 and a read-only memory (ROM) 312, store instructions and data used, generated, or collected by the processing device 306.

Repeater circuitry 314 is coupled to different locations of a FOUNDATION FIELDBUS network segment or other network segment. When the repeater circuitry 314 is activated, the repeater circuitry 314 sends messages it receives from one portion of the network segment to another portion of the network segment or vice versa. Upon the occurrence of a cable fault, the repeater circuitry 314 can therefore be activated to reconnect a broken sub-segment back into a network segment, restoring connectivity to the broken sub-segment. The repeater circuitry 314 includes any suitable structure for repeating signals, such as an RP312 active FOUNDATION FIELDBUS repeater from SPRINGFIELD RESEARCH CORP.

Note that the MAUs 302a-302b are shown as having two pairs of connections to different locations of a network segment and that the repeater circuitry 314 is shown as having two pairs of connections to different locations of the network segment. Depending on the implementation, the MAUs 302a-302b and the repeater circuitry 314 could share the same connections to the different locations of the network segment. Thus, for instance, the MAU 302a and the left side of the repeater circuitry 314 could be coupled to one location of a network segment, and the MAU 302b and the top side of the repeater circuitry 314 could be coupled to another location of the network segment.

In some embodiments, the processing device 306 can perform the following functions to provide cable fault detection. As noted above, in the absence of a cable fault, only one of the linking devices 208a-208b may operate as an active link master, with the other linking device operating as a redundant or backup link master. Upon the occurrence of a cable fault that divides the network segment 200, both linking devices 208a-208b begin operating as active link masters. The processing device 306 could therefore receive messages decoded by the communication controller 304, where those messages are received via both MAUs 302a-302b, and the processing device 306 can use the messages to identify the address(es) of any active link master(s). As a particular example, the processing device 306 could look for Time Distribution (TD) messages since only a link master may be able to send TD messages over a network segment. The processing device 306 can identify TD messages (such as by identifying Data Link Protocol Data Unit messages with a 0x11 hexadecimal identifier) and identify the source address for each TD message. The source address for each TD message denotes the network address of the active link master providing the TD message, so the presence of multiple source addresses in the TD messages is indicative of multiple active link masters.

FIG. 4 illustrates one example implementation of the repeater circuitry 314. As shown in FIG. 4, this implementation of the repeater circuitry 314 includes a repeater module 402, such as an RP312 active repeater module or other suitable repeater structure. The repeater module 402 is coupled to multiple switches 404a-404c, which are used to selectively couple the linking devices 208a-208b to the repeater circuitry 314. For instance, the switch 404a can be used to couple the positive line from the primary linking device (LDP) to the repeater module 402. The switch 404b can be used to couple the positive line from the backup linking device (LDB) to the repeater module 402. The negative lines from the primary and backup linking devices are coupled permanently to the repeater module 402, although switches could also be used as shown in FIG. 2 to control the connections of the negative lines to the repeater module 402.

The switch 404c is used to couple the positive line of the primary linking device to the negative line of the primary linking device through a bus terminator 406. Upon the occurrence of a cable fault, the switch 404c is closed to insert the bus terminator 406 into one portion of the network segment 200. The repeater module 402 also includes an integrated bus terminator 408, which eliminates the need for a similar switch to couple the positive line of the backup linking device to the negative line of the backup linking device through the bus terminator 408. If the bus terminator 408 was not integrated in this manner, a switch like the switch 404c could be used with the bus terminator 408. On the other hand, if the bus terminator 406 was integrated in the same manner as the bus terminator 408, the switch 404c could be omitted. The bus terminators 406-408 are used here to help ensure that, regardless of the location of a cable fault, two active bus terminators may be present on each sub-segment of the network segment 200.

Each switch 404a-404c denotes any suitable structure for selectively forming a communication pathway, such as a toggle switch or transistor switch. Toggle switches with multiple poles could be used so that all switches 404a-404c can be turned on or off at the same time. Each bus terminator 406-408 includes any suitable structure for terminating a network connection, such as an impedance matching network. In this example, a terminal block 410 is used to facilitate connections of the switches 404a-404c and the bus terminator 406 to the repeater module 402. Note, however, that the use of a terminal block 410 is not required and that direct connections or other connections could be made between components in FIG. 4. For example, all of the repeater circuitry 314 could be implemented using an embedded architecture with transistor switches and other integrated circuit components.

Although FIGS. 3 and 4 illustrate one example of a dynamic synchronization repeater 212 for providing fault tolerance in FOUNDATION FIELDBUS H1 networks or other networks, various changes may be made to FIGS. 3 and 4. For example, the functionality of the communication controller 304 and the processing device 306 could be integrated into a single control or processing device or sub-divided into more than two devices. Also, the repeater circuitry 314 shown in FIG. 4 denotes a simplified example implementation and does not limit this disclosure to any specific implementation.

Figure 5:
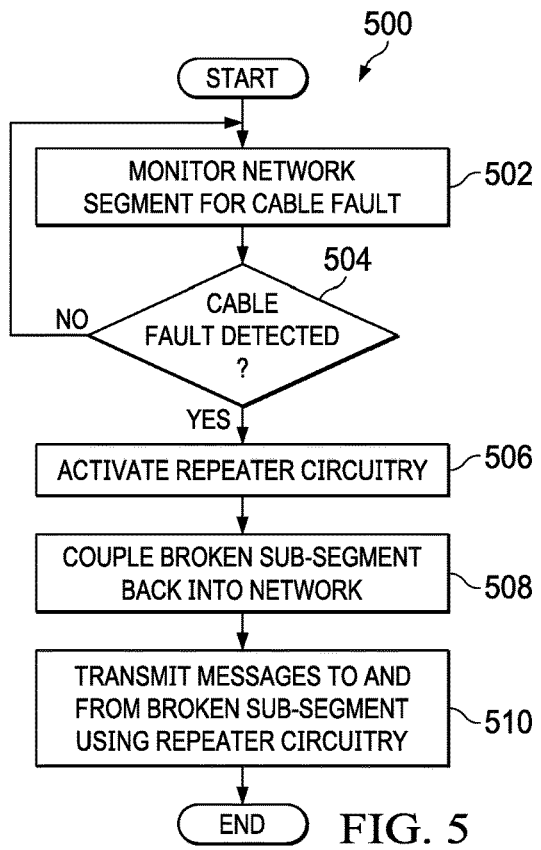
FIGS. 5 and 6 illustrate example methods for providing fault tolerance in FOUNDATION FIELDBUS H1 networks or other networks according to this disclosure.
Figure 6:
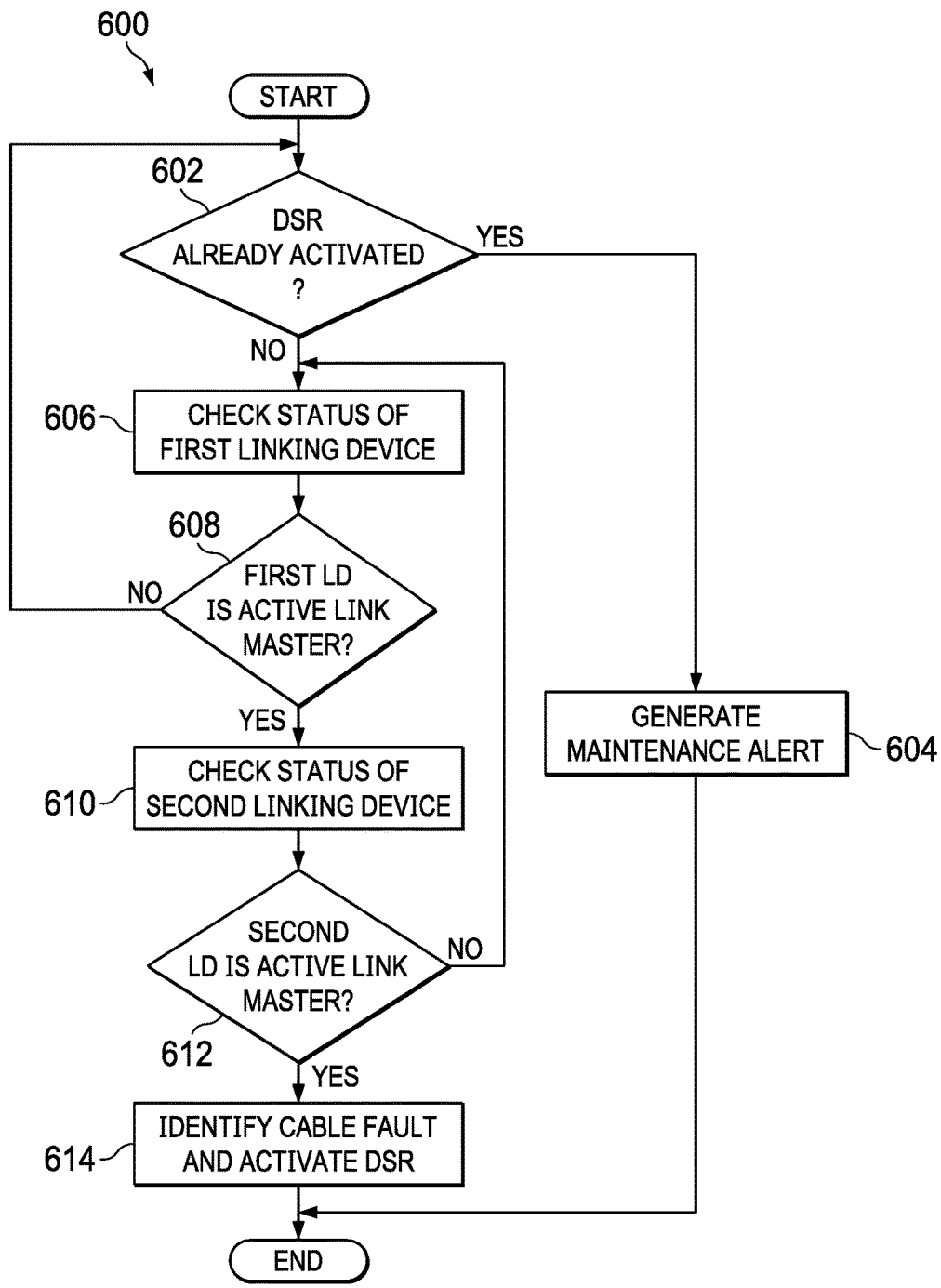

FIGS. 5 and 6 illustrate example methods for providing fault tolerance in FOUNDATION FIELDBUS H1 networks or other networks according to this disclosure. In particular, FIG. 5 illustrates an example method 500 for providing fault tolerance in a network segment, and FIG. 6 illustrates an example method 600 for cable fault detection. For ease of explanation, the methods 500 and 600 are described with reference to the dynamic synchronization repeater 212 of FIG. 3 operating with the network segment 200 of FIG. 2. However, the methods 500 and 600 could be used with any suitable device and in any suitable system.

As shown in FIG. 5, a network segment is monitored for a cable fault at step 502. This could include, for example, the processing device 306 of the dynamic synchronization repeater 212 analyzing incoming messages received from multiple locations of the network segment 200. This could also include the processing device 306 of the dynamic synchronization repeater 212 determining whether one or more linking devices are currently functioning as an active link master. A determination is made whether a cable fault has been detected at step 504. This could include, for example, the processing device 306 of the dynamic synchronization repeater 212 determining whether multiple linking devices are currently functioning as active link masters. If not, the process returns to step 502 to continue monitoring the network segment for a cable fault.

Otherwise, if a cable fault is detected (meaning a network segment has been split into multiple sub-segments), repeater circuitry is activated at step 506. This could include, for example, the processing device 306 of the dynamic synchronization repeater 212 activating the repeater circuitry 314, such as by closing one or more switches 214a-214d, 404a-404c. The repeater circuitry could also be activated in other ways, such as by selectively applying power to the repeater circuitry in response to a detected cable fault.

However the repeater circuitry is activated, the repeater circuitry at a minimum couples a broken sub-segment of a network back into the network at step 508. The repeater circuitry also transmits messages to and from the broken sub-segment at step 510. This could include, for example, the repeater circuitry 314 of the dynamic synchronization repeater 212 coupling a broken sub-segment of a network segment 200 onto another sub-segment of the same network segment 200. This could also include the repeater circuitry 314 of the dynamic synchronization repeater 212 transporting messages to and from the broken sub-segment so that devices coupled to the broken sub-segment remain connected to the network and available for performing process control and automation-related functions.

As shown in FIG. 6, one technique for identifying a cable fault can occur as follows. A determination is made whether a dynamic synchronization repeater has been activated without the detection of a cable fault at step 602. If so, a maintenance alert or other alarm is raised at step 604. In this case, the dynamic synchronization repeater 212 may be malfunctioning since no cable fault has been detected.

Otherwise, the status of a first linking device is checked at step 606. This could include, for example, the processing device 306 of the dynamic synchronization repeater 212 receiving copies of messages sent over a network segment 200 via the MAUs 302a-302b. This could also include the processing device 306 of the dynamic synchronization repeater 212 determining whether a specified one of the linking devices 208a-208b is currently operating as an active link master. A determination is made whether the first linking device is an active link master at step 608. If not, both linking devices 208a-208b are not operating as active link masters, so no cable fault has occurred. At that point, the process returns to step 602 to continue monitoring for a cable fault.

If so, the status of a second linking device is checked at step 610. This could include, for example, the processing device 306 of the dynamic synchronization repeater 212 receiving copies of messages sent over the network segment 200 via the MAUs 302a-302b. This could also include the processing device 306 of the dynamic synchronization repeater 212 determining whether a second specified one of the linking devices 208a-208b is currently operating as an active link master. A determination is made whether the second linking device is an active link master at step 612. If not, both linking devices 208a-208b are not operating as active link masters, so no cable fault has occurred. At that point, the process returns to step 606 to continue monitoring for a cable fault.

Otherwise, both linking devices 208a-208b are operating as active link masters, meaning a cable fault has occurred. The cable fault is identified and the dynamic synchronization repeater is activated at step 614. This could include, for example, the processing device 306 of the dynamic synchronization repeater 212 activing the repeater circuitry 314.

Although FIGS. 5 and 6 illustrate examples of methods for providing fault tolerance in FOUNDATION FIELDBUS H1 networks or other networks, various changes may be made to FIGS. 5 and 6. For example, while shown as a series of steps, various steps of each figure could overlap, occur in parallel, occur in a different order, or occur any number of times. Also, various other approaches could be used to detect a cable fault, and various other approaches could be used to activate or control repeater circuitry.

Note that while this document often describes the use of the dynamic synchronization repeater 212 with a FOUNDATION FIELDBUS network, the dynamic synchronization repeater 212 could be used with various other types of networks. For example, PROFIBUS PA is another industrial network protocol that uses the same Physical Layer specification (IEC61158) as FOUNDATION FIELDBUS H1. The dynamic synchronization repeater 212 could therefore easily be applied to PROFIBUS PA networks, as well. Other types of networks (even if based on other Physical Layer specifications) could also benefit from the use of dynamic synchronization repeaters.

In some embodiments, various functions described in this patent document are implemented or supported by a computer program that is formed from computer readable program code and that is embodied in a computer readable medium. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

It may be advantageous to set forth definitions of certain words and phrases used throughout this patent document. The terms "application" and "program" refer to one or more computer programs, software components, sets of instructions, procedures, functions, objects, classes, instances, related data, or a portion thereof adapted for implementation in a suitable computer code (including source code, object code, or executable code). The term "communicate," as well as derivatives thereof, encompasses both direct and indirect communication. The terms "include" and "comprise," as well as derivatives thereof, mean inclusion without limitation. The term "or" is inclusive, meaning and/or. The phrase "associated with," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, have a relationship to or with, or the like. The phrase "at least one of," when used with a list of items, means that different combinations of one or more of the listed items may be used, and only one item in the list may be needed. For example, "at least one of: A, B, and C" includes any of the following combinations: A, B, C, A and B, A and C, B and C, and A and B and C.

The description in this patent document should not be read as implying that any particular element, step, or function is an essential or critical element that must be included in the claim scope. Also, none of the claims is intended to invoke 35 U.S.C. § 112(f) with respect to any of the appended claims or claim elements unless the exact words "means for" or "step for" are explicitly used in the particular claim, followed by a participle phrase identifying a function. Use of terms such as (but not limited to) "mechanism," "module," "device," "unit," "component," "element," "member," "apparatus," "machine," "system," "processor," "processing device," or "controller" within a claim is understood and intended to refer to structures known to those skilled in the relevant art, as further modified or enhanced by the features of the claims themselves, and is not intended to invoke 35 U.S.C. § 112(f).

While this disclosure has described certain embodiments and generally associated methods, alterations and permutations of these embodiments and methods will be apparent to those skilled in the art. Accordingly, the above description of example embodiments does not define or constrain this disclosure. Other changes, substitutions, and alterations are also possible without departing from the spirit and scope of this disclosure, as defined by the following claims.

What is claimed is:

1. An apparatus comprising:
at least one processing device configured to detect a cable fault that divides a network segment into first and second portions and that communicatively disconnects the second portion of the network segment from the first portion of the network segment;
a repeater configured to communicatively connect the second portion of the network segment to the first portion of the network segment such that one or more devices associated with the first portion of the network segment maintain communication with one or more devices associated with the second portion of the network segment; and
a communication controller configured to receive and decode messages transmitted over the first and second portions of the network segment;
wherein the at least one processing device is configured to detect the cable fault using at least some of the decoded messages,
identify whether one or more of multiple linking devices coupled to the network segment are operating as active link masters using at least some of the decoded messages; and
detect the cable fault when more than one of the linking devices is operating as an active link master.

2. The apparatus of claim 1, further comprising:
multiple switches configured to be closed to couple the repeater to the first and second portions of the network segment.

3. An apparatus comprising:
at least one processing device configured to detect a cable fault that divides a network
segment into first and second portions and that communicatively disconnects the second portion of the network segment from the first portion of the network segment: and
a repeater configured to communicatively connect the second portion of the network segment to the first position of the network segment such that one or more devices associated with the first portion of the network segment maintain communication with one or more devices associated with the second poltion of the network segment;
wherein the repeater comprises multiple bus terminators configured to be activated in response to the detected cable fault, different bus terminators associated with different ones of the first and second portions of the network segment.

4. The apparatus of claim 3, further comprising:
one or more switches configured to be closed to couple at least one of the bus terminators to at least one of the first and second portions of the network segment.

5. The apparatus of claim 3, further comprising:
a communication controller configured to receive and decode messages transmitted over the first and second portions of the network segment;
wherein the at least one processing device is configured to detect the cable fault using at least some of the decoded messages.

6. The apparatus of claim 3, further comprising: multiple medium attachment units configured to couple the apparatus to the first and second portions of the network segment and to provide the messages to the communication controller.

7. A system comprising:
a network segment comprising (i) cabling that couples multiple junction boxes configured to be coupled to multiple devices and (ii) power supplies configured to provide power to the multiple devices; and
a dynamic synchronization repeater comprising:
at least one processing device configured to detect a cable fault that divides the network segment into first and second portions and that communicatively disconnects the second portion of the network segment from the first portion of the network segment; and
a repeater configured to communicatively connect the second portion of the network segment to the first portion of the network segment such that one or more of the multiple devices that are associated with the first portion of the network segment maintain communication with one or more other of the multiple devices that are associated with the second portion of the network segment;
wherein the repeater comprises multiple bus terminators configured to be activated in response to the detected cable fault, different bus terminators associated with different ones of the first and second poliions of the network segment.

8. The system of claim 7, wherein the dynamic synchronization repeater further comprises multiple switches configured to be closed to couple the repeater to the first and second portions of the network segment.

9. The system of claim 7, wherein the dynamic synchronization repeater further comprises one or more switches configured to be dosed to couple at least one of the bus terminators to at least one of the first and second portions of the network segment.

10. The method of claim 8, further comprising: closing one or more switches to couple at least one of the bus terminators to at least one of the first and second poliions of the network segment.

11. A system comprising:
a network segment comprising (i) cabling that couples multiple junction boxes configured to
be coupled to multiple devices and (ii) power supplies configured to provide power to the multiple devices; and
a dynamic synchronization repeater comprising:
at least one processing device configured to detect a cable fault that divides the
network segment into first and second portions and that communicatively disconnects the second position of the network segment from the first portion of the network segment;
a repeater configured to communicatively connect the second position of the network
segment to the first position of the network segment such that one or more of the multiple devices that are associated with the first portion of the network segment maintain communication with one or more other of the multiple devices that are associated with the second portion of the network segment; and
the dynamic synchronization repeater further comprises a communication controller configured to receive and decode messages transmitted over the first and second portions of the network segment;
wherein the at least one processing device is configured to:
detect the cable fault using at least some of the decoded messages,
identify whether one or more of multiple linking devices coupled to the network segment are operating as active link masters using at least some of the decoded messages; and detect the cable fault when more than one of the linking devices is operating as an active link master.

12. The system of claim 11, wherein the dynamic synchronization repeater further comprises multiple medium attachment units configured to couple the dynamic synchronization repeater to the first and second portions of the network segment and to provide the messages to the communication controller.

13. The system of claim 11, wherein the repeater comprises multiple bus terminators configured to be activated in response to the detected cable fault, different bus terminators associated with different ones of the first and second portions of the network segment.

14. A method comprising:
detecting, using at least one processing device, a cable fault that divides a network segment into first and second portions and that communicatively discomlects the second portion of the network segment from the first portion of the network segment; and
communicatively connecting the second portion of the network segment to the first portion of the network segment using a repeater such that one or more devices associated with the first poliion of the network segment maintain communication with one or more devices associated with the second portion of the network segment;
wherein the repeater comprises multiple bus terminators configured to be activated in response to the detected cable fault different bus terminators associated with different ones of the first and second portions of the network segment.

15. A method comprising: The method of claim 14, further comprising:
detecting, using at least one processing device, a cable fault that divides a network segment into first and second portions and that communicatively disconnects the second portion of the network segment from the first portion of the network segment;
communicatively connecting the second portion of the network segment to the first portion of the network segment using a repeater such that one or more devices associated with the first portion of the network segment maintain communication with one or more devices associated with the second portion of the network segment; and
receiving and decoding messages transmitted over the first and second portions of the network segment;
wherein detecting the cable fault comprises detecting the cable fault using at least some of the decoded messages.

16. The method of claim 15, wherein detecting the cable fault using at least some of the decoded messages comprises:
identifying whether one or more of multiple linking devices coupled to the network segment are operating as active link masters using at least some of the decoded messages; and detecting the cable fault when more than one of the linking devices is operating as an active link master.

17. The method of claim 14, further comprising:
closing multiple switches to couple the repeater to the first and second poliions of the network segment.

18. The method of claim 15, wherein the repeater comprises multiple bus terminators configured to be activated in response to the detected cable fault, different bus terminators associated with different ones of the first and second portions of the network segment.

* * * * *